United States Patent [19]

Ringwall

[11] 4,107,990
[45] Aug. 22, 1978

[54] FLUIDIC FLOW AND VELOCITY SENSOR

[75] Inventor: Carl G. Ringwall, Scotia, N.Y.

[73] Assignee: General Electric Company, Wilmington, Mass.

[21] Appl. No.: 738,067

[22] Filed: Nov. 2, 1976

[51] Int. Cl.[2] .............................................. G01F 1/20
[52] U.S. Cl. .............................................. 73/194 B
[58] Field of Search .............. 73/194 B; 137/835, 826, 137/839, 840

[56] References Cited

U.S. PATENT DOCUMENTS

| | | | |
|---|---|---|---|
| 3,158,166 | 11/1964 | Warren | 137/835 |
| 3,185,166 | 5/1965 | Horton et al. | 137/835 |
| 3,554,004 | 1/1971 | Rauch et al. | 73/32 A |
| 3,902,367 | 9/1975 | Grant et al. | 137/194 |

FOREIGN PATENT DOCUMENTS

| | | | |
|---|---|---|---|
| 1,246,861 | 9/1971 | United Kingdom | 137/835 |
| 1,225,570 | 3/1971 | United Kingdom | 137/835 |
| 1,219,747 | 1/1971 | United Kingdom | 137/835 |

Primary Examiner—Herbert Goldstein

[57] ABSTRACT

A flowmeter of the fluid oscillator type having a fluid jet which oscillates at a frequency indicative of flow rate. By elimination of wall attachment effects and use of a proportional type amplifier, the range of the flowmeter is substantially extended beyond the limit of turbulent flow conditions. Linearity is improved by use of a differential pressure type of fluid jet control and the range may be further extended by use of multiple amplifier stages.

9 Claims, 7 Drawing Figures

FLUIDIC FLOW AND VELOCITY SENSOR

BACKGROUND OF THE INVENTION

The present invention relates to flowmeters and flow sensors of the type utilizing a fluid oscillator so arranged that the frequency of oscillation is indicative of the flow rate being measured or indicated.

For flowmeter applications where long life, little wear and insensitivity to adverse environmental influences such as excessive vibration are particularly important, efforts have been made to develop reliable and accurate flowmeters with no moving parts. Flowmeters of this type have been proposed using fluid amplifiers with negative feedback connections which cause the amplifier to oscillate at a frequency indicative of flow rate.

Heretofore such no-moving part flowmeters have utilized fluid amplifiers of the digital or bistable type which operate on jet interaction and wall-attachment principles. In these amplifiers, a power jet directed between two side walls will attach to one wall with positive feedback due to boundary layer effects until forcibly displaced to the other side wall by a control jet interacting with the power jet. By using a pair of fluid receivers and a pair of control jets on opposite sides of the power jet and interconnecting the receivers and control jets by negative feedback connections, a flip-flop, discontinuous type of oscillation is obtained. With the power jet connected in circuit with the fluid flow being measured, the oscillation frequency will vary with flow rate and is a result of interaction of the positive and negative feedback forces applied to the power jet. Flowmeters using such bistable, digital amplifiers are shown, for example, in U.S. Pat. Nos. 3,238,960—Hatch, Jr.; 3,640,133—Adams; and 3,855,859—Adams.

A problem with no-moving-part flowmeters of the prior art type has been that they have a limited range of operation so that their use is precluded for many applications. The reason for this is that the wall attachment effect on which the fluid amplifier depends for positive feedback effect operates only for conditions of turbulent flow. Expressed in terms of Reynolds number, which is used in fluid dynamics to indicate, inter alia, a transition point between turbulent and laminar flow, these flowmeters have no useful linear output for flow rates below that for which the Reynolds number defining the flow condition is less than approximately 2000.

Accordingly, it is an object of the invention to provide a flowmeter or flow sensor of the fluid oscillator type which is operative for laminar as well as turbulent flow conditions and thus has a greater useful operating range than has been possible heretofore.

A further object of the invention is to provide a flowmeter or flow sensor of the fluid oscillator type having a lower limit of operation expressed in terms of Reynolds number that is of the order of 400 or less and thus lower than has been heretofore possible by a factor at least 5 to 1.

A still further object is to provide a flowmeter or flow sensor of the fluid oscillator type which has improved linearity and hence better accuracy over an extended flow range.

Another object of the invention is to provide a flowmeter of the fluid oscillator type in which the amplifier element has a proportional rather than a bistable input-output characteristic so that multiple amplifier stages may be used further to extend the useful flow measurement range.

Further objects and advantages of the invention will become apparent as the following description proceeds.

SUMMARY

Briefly, the fluid amplifier used in the flowmeter has a nozzle for accelerating a jet of fluid into an interaction chamber where a portion of the jet is received by a pair of oppositely disposed fluid receivers in differentially variable amounts depending on the position of the jet. The lateral position of the jet is controlled by opposing pressures exerted thereon laterally through control ports connected to the receivers through negative feedback conduits so that the jet oscillates. The side walls of the interaction chamber between the control ports and the receivers are spaced from the jet and vented so that boundary layer effects tending to cause the jet to lock on the side walls are eliminated. The lateral deflection of the jet is thus responsive only to the differential pressure exerted thereon by the control ports. Being independent of boundary layer effects the fluid oscillator works equally well for turbulent and laminar flow conditions so that the flow range is extended. In order to maintain linearity of the flowmeter through the extended flow range certain amplifier configurations, described more fully below, are used as a result of which the phase lag; i.e., time delay, of the feedback signal in the feedback conduits remains substantially constant for various flow rates and jet velocities. The oscillation period is thus determined primarily by the time required for the fluid to move between the nozzle and the receiver called jet transport lag or transit time, which is directly proportional to the flow rate to be measured.

For a better understanding of the invention, reference should be made to the following detailed description taken in connection with the accompanying drawings.

DESCRIPTION OF THE ILLUSTRATED EMBODIMENTS

Figure 3:
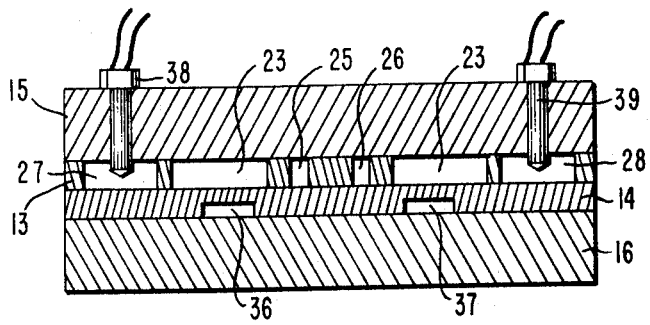
FIG. 3 is a front sectional view of the flowmeter along the section line 3—3 of FIG. 1 looking in the direction of the arrows.

The flowmeter of the present invention is a no-moving-part type employing a fluid amplifier with negative feedback connections which cause it to function as a fluid oscillator. The oscillation rate is proportional to the flow rate through the oscillator which is the same or proportional to the flow rate to be measured and indicated. The construction of the flowmeter is illustrated in FIGS. 1, 2 and 3 of the drawing to which reference will now be made.

The flowmeter comprises a housing 10 having threaded inlet and outlet connections 11 and 12 adapted to be connected in a fluid line (not shown) conducting a fluid, either liquid or gaseous, the volumetric flow rate of which is to be measured. The housing has internal fluid flow passages to be described formed in any suitable manner which carry the measured fluid between the inlet and outlet connections. In the form illustrated, these fluid passages are formed in and by two adjacent laminations or plates 13 and 14 held in position between top and bottom cover plates 15 and 16. The assembly is held together in any suitable manner as by screws or rivets (not shown). In actual practice, the plates 13 and 14 may conveniently be formed of a stack of relatively thin laminations of a suitable material such as stainless steel held together by a diffusion bonding process.

Figure 1:
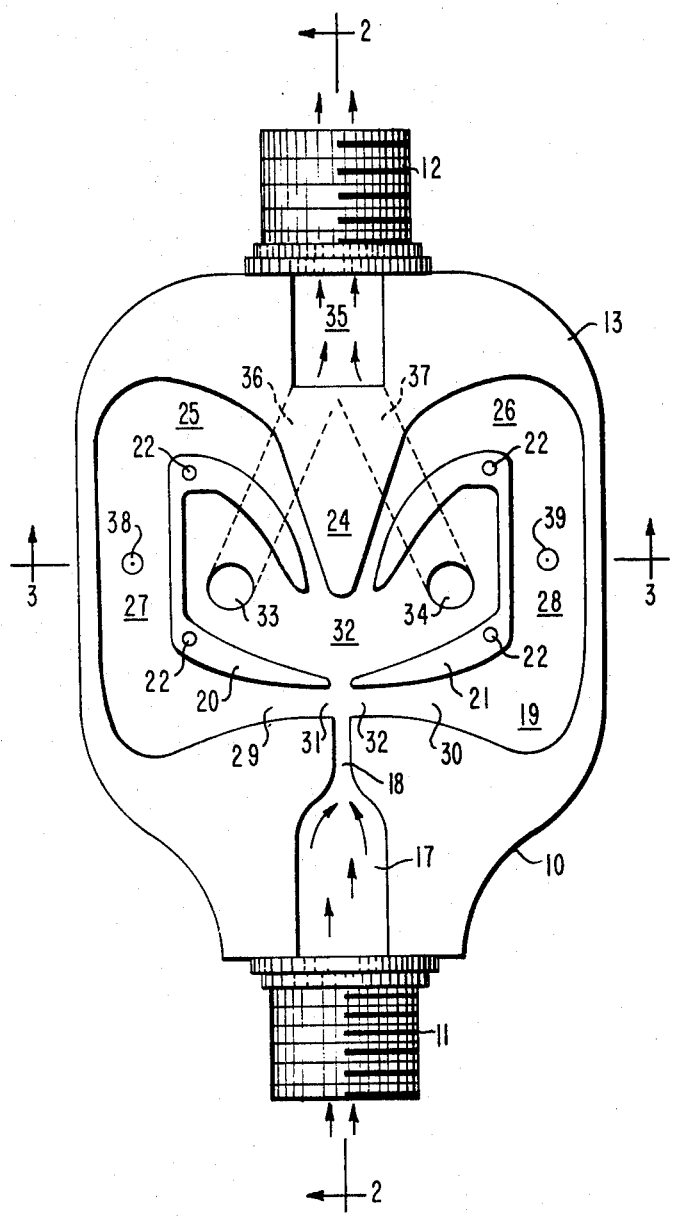
FIG. 1 is a plan view of a flowmeter embodying the invention with the cover plate removed to show the configuration of the flow passages therein.
Figure 2:
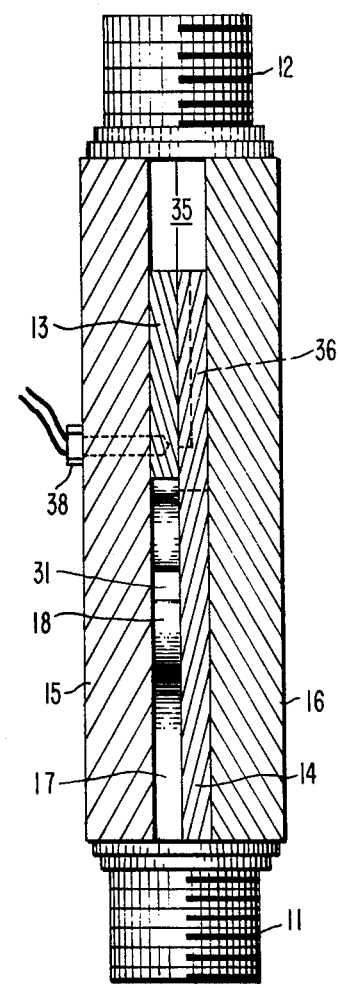
FIG. 2 is a side elevational view taken along the section line 2—2 of FIG. 1 looking in the direction of the arrows.

As best shown in FIG. 1, where the cover plate 15 has been removed, the plate 13 has a cutaway portion forming a plenum chamber 17 communicating at the bottom with the inlet connection 11 and having at the top a converging portion forming a fluid accelerating nozzle 18. The central part of plate 13 has an enlarged opening 19 closed at the bottom by plate 14 and at the top by cover 15 when in the assembled position. Symmetrically mounted within the opening 19 on opposite sides of a center line through nozzle 18 are two C-shaped members 20 and 21. These are properly positioned by rivets or stakes passing through holes 22 and extending into plate 14. The inner walls of the members 20 and 21 which face each other form an enclosure 23 termed an interaction chamber into which a fluid jet from nozzle 18 passes through the bottom opening between the members. The upper outer walls of members 20 and 21 form, together with a centrally positioned projection 24 depending from plate 13, oppositely disposed diverging passages or fluid receivers 25 and 26 leading from chamber 23. The outer side walls of members 20 and 21 form together with the side walls of opening 19 in plate 13 a pair of negative feedback conduits 27 and 28. The bottom outer walls of members 20 and 21 together with the bottom wall of opening 19 in plate 13 are configured to form converging passages 29 and 30 terminating in fluid openings referred to as control ports 31 and 32. These ports are located on opposite sides of and closely adjacent to the base of the jet issuing from nozzle 18 upstream with respect to the interaction chamber.

Fluid entering interaction chamber 23 leaves the chamber through vent openings 33 and 34 placed on opposite sides of the fluid jet. These vents are connected to an exit chamber 35 by passageways 36 and 37 formed by cutting grooves in the bottom of plate 14 as best shown in FIG. 3. Fluid flows from the exit chamber 35 out through outlet coupling 12.

Considering now the fluid flow conditions in the flowmeter assume that a flow to be measured enters the flowmeter through inlet connection 11, passes through chamber 17 and nozzle 18 producing a jet passing into the interaction chamber 23, the central axis of the jet being aligned with projection 24. An equally divided part of the flow will enter receivers 25 and 26, pass through feedback conduits 27 and 28 and converging conduits 29 and 30 to rejoin the jet after exiting through control ports 31 and 32. For this condition, assuming it to be steady state, the lateral pressures exerted on the jet by the control ports are equal. If the jet is deflected to the left, more fluid will enter receiver 25 than enters receiver 26 and more fluid exits port 31 than port 32. Thus the pressure exerted on the jet through port 31 is greater than that exerted by port 32 and the jet is deflected to the right. With the jet in the right of center position, more fluid enters receiver 26 than receiver 25 so that port 32 exerts more pressure on the jet than port 31 moving it back again to the left position. In this manner, the jet oscillates laterally and the oscillation frequency is a function of the flow rate through the flowmeter which is the condition desired to be measured.

The oscillation of the jet produces pressure and flow perturbations in the feedback conduits 27 and 28 which can be sensed by any suitable transducer and read out as an indication of volumetric flow rate. The transducer can, for example, be piezoelectric, thermistor, hot wire or reluctance type and measurements may be made in either feedback passage or both.

Figure 4:
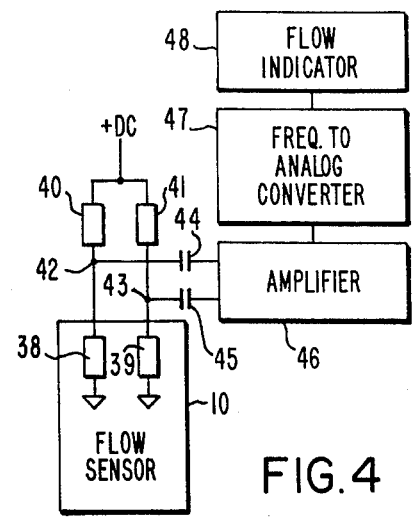
FIG. 4 is a schematic connection diagram showing how the flow signal is produced and displayed.

A thermistor sensor system using two thermistors with their outputs differentially summed is preferred in order to obtain increased gain, improved reliability and decreased sensitivity to D.C. supply current flow changes. As best shown in FIG. 3, two thermistors 38 and 39 of known construction, are mounted to extend through cover plate 15 so that their temperature sensitive lower ends project into the feedback passages 27 and 28. As shown in schematic circuit diagram of FIG. 4 direct current flows through two branches containing dropping resistors 40 and 41 to the heater elements of thermistors 38 and 39. These heater elements are differentially cooled by periodic changes in the pressure and flow conditions in feedback passages 27 and 28 and the resulting resistance changes produces an A.C. voltage across connection points 42 and 43. After passing through D.C. isolating capacitors 44 and 45, the A.C. signal is amplified in amplifier 46. In an analog readout system, the A.C. signal is then fed to a frequency-to analog converter 47 and then read out on a suitable flow indicator 48. Where a counter system is used to indicate flow rate, the A.C. signal may be clipped to form a square wave which is then fed to a pulse counter where the pulses are periodically totaled in a well-known manner.

Figure 5:
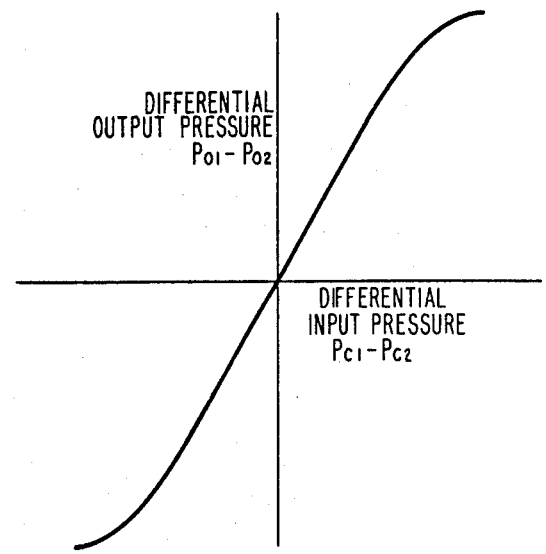
FIG. 5 is a graphical representation illustrating an operating characteristic of the fluid amplifier forming a part of the flowmeter.

As pointed out above prior art no-moving-part flowmeters have utilized bistable fluid amplifiers in which the jet oscillation is the result of a complex interaction of a positive feedback action caused by boundary layer and wall attachment effects and negative feedback action caused by control jets impinging laterally on the fluid jet. The result is a discontinuous, flip-flop kind of jet oscillation which is operative only for turbulent flow conditions in the flowmeter thus greatly limiting its operative flow range. According to one aspect of this invention, boundary layer and wall attachment effects are eliminated whereby the jet is deflected solely by the differential pressure action of the control ports 31 and 32. This is accomplished by the oscillator construction wherein side walls of the interaction chamber are widely spaced from the fluid jet and cannot, by fluid entrainment, create a reduced pressure on one side of the jet which causes it to lock on a side wall adjacent to the jet. In addition to the spacing of the side walls, it will be noted that the vent openings 33 and 34 on opposite sides of the jet centerline and around which the curved interior surfaces of the members 20 and 21 are disposed, assist in preventing any differential pressure buildup that would cause a wall attachment effect influencing jet fluid entering receivers 25 and 26. Thus the lateral position of the jet is controlled entirely by the differential pressure exerted thereon by the control ports 31 and 32 and this effect occurs for laminar as well as turbulent flow conditions thus extending the operating range of the flowmeter. Furthermore, it gives the fluid amplifier a proportional; i.e., analog operating characteristic, as distinguished from a bistable; i.e., digital characteristic, which is advantageous for reasons to be pointed out. This proportional amplifier characteristic is illustrated in FIG. 5 which shows the proportional relationship between the differential input pressure $Pc_1 - Pc_2$ applied to the jet through control ports 31 and 32 and the resulting differential output pressure $Po_1 - Po_2$ occurring in receivers 25 and 26, the proportionality factor being a function of the amplifier gain.

According to another aspect of the invention, the linearity of the flow vs. frequency operating characteristic of the flowmeter over the extended flow range is improved by an additional constructional feature now to be described and explained. It will be noted that the control ports 31 and 32 are closely spaced to the jet spouting from the nozzle 18. Further, the area of the control ports is made relatively small so that flow therethrough is relatively small in practice being of the order of 10% of the total flow through the nozzle. With this construction, the jet is deflected in response to a pressure differential. It has been found by experience that with this construction the input and output fluid flow resistance through the fluid feedback network varies in proportion to the jet velocity. In a manner to be explained, this results in a constant phase lag; i.e., time delay, in the feedback signal caused by the feedback conduit impedances. Considering the closed feedback loop, the phase lag and resulting oscillation frequency is then determined entirely by the fluid transport lag in the jet which is proportional to the flow rate to be measured. This results in a more nearly linear instrument.

The foregoing operating improvement can be understood more easily by a consideration of the mathematical relationships involved.

The oscillator output frequency can be defined based on the defined phase lags as:

$$f = \frac{1}{2(Tv + Ta)} \left[ 1 - \frac{\phi_f}{\pi} \right] \quad (1)$$

where
$f$ = Output frequency of the oscillator
$Tv$ = Jet transport lag (transit time)
$Ta$ = Acoustic transport delay
$\phi_f$ = Phase lag of feedback network For the subsonic jet velocities involved in a typical flowmeter the acoustic transport delay Ta is small being of the order of $10^{-4}$ seconds and can be neglected. Thus from the above equation, it can be seen that if the phase lag of the feedback network can be kept constant the oscillator frequency $f$ will vary directly with the jet velocity. This is because the jet transport lag (transit time) is the time it takes a particle of fluid to travel from the nozzle to the fluid receiver and this quantity is a function of jet velocity.

Figure 6:
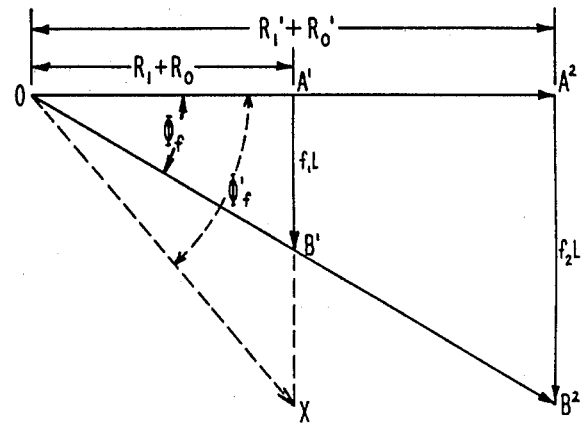
FIG. 6 is a vector diagram useful in explaining an operating characteristic of the flowmeter.

The phase shift of the feedback network $\phi_f$ is fixed by the inductance to resistance ratio and is defined as:

$$\phi_f = \text{Tan}^{-1} \frac{2\pi fL}{Ri + Ro} \quad (2)$$

where
$L$ = fluid inductance of the feedback loop
$Ri$ = amplifier input resistance
$Ro$ = amplifier output resistance From the foregoing equation (2), it can be seen that the ratio $fL/Ri+Ro$ must remain constant or the phase angle $\phi_f$ will change. This can also be seen graphically by reference to the vector diagram of FIG. 6 where the vector OA' represents the resistance in the feedback loop caused by resistances Ri+Ro at a frequency $f_1$ and the vector A'B' representing the quantity $f_1L$ is the inductive reactance or inertance at the same frequency $f_1$. The phase lag angle $\phi_f$ lies between the vector OA' and the resultant vector OB'. At a frequency $f_2$ twice $f_1$ the vector $A_2B_2$ representing quantity $f_2L$ will be twice as large as vector $A_1B_1$. If the quantity $R_1+R_2$ varies with frequency as in the subject invention, then the vector $OA_2$ representing this quantity Ri'+Ro' at frequency $f_2$ will also be twice as long as OA' and the feedback loop phase angle $\phi_f$ will not change. However, if the quantity Ri+Ro does not change with frequency then resulting impedance will be OX and the phase angle will increase to $\phi_f'$.

With reference to the foregoing explanation, it should be pointed out that there are proportional fluid amplifiers known as the momentum interaction as distinguished from the pressure differential type which utilize relatively large control ports and control jet flows with the control ports set back from the power jet so that a control jet develops which impinges on and deflects the main or power jet. With this type of fluid amplifier, the amplifier input and output resistances Ri and Ro do not vary proportionally with jet velocity and this characteristic tends to make flowmeters using such an amplifier non-linear and hence less accurate.

Improvement in the flowmeter range obtained by the present invention using a proportional fluid amplifier rather than a bistable wall attachment amplifier of the prior art can be seen from the following considerations. The upper limit of the flowmeter range is determined by the maximum permissible pressure drop across the flowmeter. Usually, it is specified for a given application and is a small percentage of the system pressure. For a given maximum pressure drop there is a minimum Reynolds number at which the amplifier gain drops to a point where it will no longer oscillate. In the prior art, flowmeters using wall attachment amplifiers, this minimum Reynolds number is 2000 which is the transition point from turbulent to laminar flow. In flowmeters using a proportional amplifier in accordance with the present invention, the amplifier will continue to oscillate for Reynolds numbers down to the 200 to 400 range. The resulting improvement in performance can be shown by the following equation which relates the maximum pressure drop permitted across the flowmeter to the minimum operating Reynolds number and other parameters such as flow range, viscosity and density.

$$P_{max} = \left( \frac{Q_{max}}{Q_{min}} \right)^2 \frac{[\gamma Re_{min}]^4}{2\rho^3 Q_{min}^2} g^3 \quad (3)$$

where

Pmax = maximum pressure drop across flowmeter
Qmax = maximum flow or velocity through the flowmeter
Qmin = minimum flow or velocity through the flowmeter
$Re_{min}$ = minimum operating Reynolds number
g = gravitational constant
y = absolute viscosity of the fluid
p = fluid density.

As shown by the preceding equation, the maximum pressure drop varies as the fourth power of the minimum operating Reynolds number. Assuming a 5 to 1 improvement in the minimum Reynolds number, the flowmeter of the present invention requires only 0.0016 the pressure drop of a flowmeter using a wall attachment amplifier. This assumes that the flow range, mimimum flow and viscosity of the fluid are the same. Also for the same pressure drop the flowmeter of the present invention can accommodate a fluid viscosity 5 times greater than a flowmeter using a well-attachment amplifier.

Figure 7:
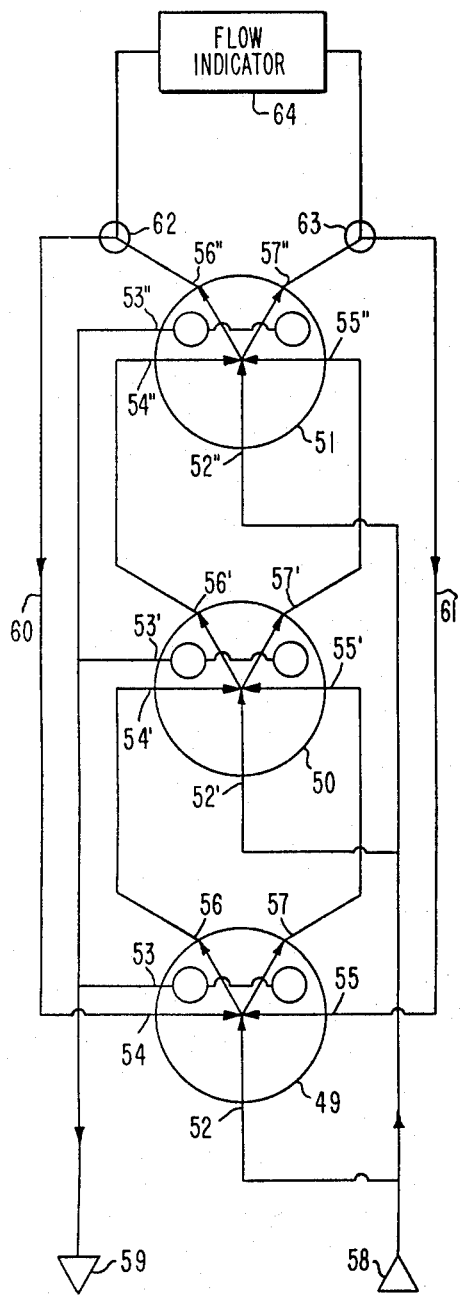
FIG. 7 is a schematic circuit connection diagram showing how a plurality of fluid amplifiers may be staged in series relation to increase the operating range of the flowmeter.

In FIG. 7, there is shown a modified arrangement for further extending the flowmeter range by use of a plurality of series-connected, staged, fluid amplifier units. By way of example, three fluid amplifiers 49, 50 and 51 are shown schematically, each of which may be similar in construction to the amplifier shown in FIGS. 1, 2 and 3. Each has an inlet connection 52 leading to the nozzle, an outlet 53 leading from the vents, two amplifier input connections 54 and 55 leading to the control ports and two output connections 56 and 57 leading from the fluid receivers. The flowmeter has a fluid inlet connection 58 communicating with the inlets 52, 52' and 52" of the three amplifier stages and an outlet connection 59 communicating with the three amplifier outlet connections 53, 53' and 53" so that the fluid, the flow rate of which is being measured, flows in all three amplifier stages. It will be noted that the amplifier output connections 56 and 57 for amplifier 49 are connected to the amplifier input connections 54' and 55' of amplifier 50. Similarly, the output connections 56' and 57' of amplifier 50 are connected to the input connections 54" and 55" of amplifier 51 so that all three amplifier stages are connected in series. Also there are feedback conduits 60 and 61 connecting the output connections 56" and 57" of third stage amplifier 51 to the amplifier input connections 54 and 55 of first stage amplifier 49. In this manner, the system is made to oscillate at a frequency indicative of the flow rate through conduits 58 and 59. Thermistors 62 and 63 in the feedback conduits are connected to a flow indicator 64 to indicate flow rate as previously described in connection with FIG. 1. Because the increase in amplifier gain obtained by staging, the flowmeter will oscillate at a lower flow rate than would be possible with one stage. In this manner, the flow range is extended. Obviously, the gain will depend on the number of amplifier stages used.

To minimize undesirable phase lag in the feedback signal, the connections in the fluid amplifier and, with reference to FIG. 7, between amplifier stages should be as short as possible. One way to do this is to form one or more amplifiers in a series of stacked contiguous laminations appropriately cut out and configured to form the desired interconnecting flow passageways and conduits.

While there have been shown what are considered to be preferred embodiments of the invention, it will be apparent to those skilled in the art that various changes and modifications may be made therein without departing from the spirit and scope of the invention.

What is claimed as new and desired to be secured by Letters Patent of the United States is:

1. A flowmeter having inlet and outlet passages adapted to be connected in a fluid conduit for sensing fluid flow through said conduit comprising:
    a. a housing having wall portions forming a jet interaction chamber,
    b. fluid accelerating means connected to the inlet passage and arranged to generate and direct a fluid jet through the interaction chamber,
    c. venting conduit means leading from the chamber to the outlet passage,
    d. a pair of fluid receiver means disposed in said interaction chamber on opposite sides of the jet for receiving differentially variable portions of fluid from the jet in response to lateral deflection of the jet from a center position,
    e. means forming control ports disposed on opposite sides of the jet upstream of the jet interaction chamber for laterally deflecting the jet, said control ports being positioned closely adjacent to the base of said fluid jet to provide lateral deflection by virtue of the differential pressure existing on opposite sides of the jet, the area of said ports being such that a small percentage of the total fluid jet passing through the interaction chamber passes through said ports, whereby the input and output fluid flow resistance varies proportionally to the fluid velocity,
    f. feedback conduit means interconnecting the receiver means and the control ports to cause oscillation of the jet by application on a negative feedback differential pressure signal thereto,
    g. means forming part of said interaction chamber to prevent pressure differentials on opposite sides of the jet in the interaction chamber due to fluid entrainment, thereby preventing lateral jet deflection in said chamber and attachment of the jet to the wall of said chamber, whereby the flowmeter operates in an extended flow range which includes laminar as well as turbulent flow conditions for the fluid passing through the interaction chamber, and
    h. means sensing the jet oscillation frequency to indicate flow rate through said conduit.

2. The flowmeter of claim 1 wherein the venting conduit means is arranged to prevent differential pressure building in the interaction chamber on opposite sides of the jet tending to cause jet deflection by boundary layer effects.

3. The flowmeter of claim 2 wherein the venting conduit means includes two openings in the interaction chamber on opposite sides of the jet, each opening being located between the jet and a side wall of the chamber.

4. The flowmeter of claim 1 wherein the differential pressure applied to the control ports is proportionally related to the resulting differential pressure in the receiver means.

5. The flowmeter of claim 1 wherein the control ports are located closely adjacent to the jet so as to cause the flow impedance to vary with velocity of the jet to maintain a negligible phase lag for the feedback means whereby the frequency of the jet oscillation is directly proportional to the jet velocity and hence the fluid flow velocity.

6. The flowmeter, according to claim 1 wherein the side walls of the interaction chamber curve away from the axis of the jet sufficiently to prevent wall attachment.

7. The fluidic flowmeter according to claim 6 including venting conduits positioned between the jet and said curving sidewall of said chamber to prevent differential pressure in the interaction chamber on opposite sides of the jet, thereby eliminating jet deflection by boundary layer effects and attachment to a sidewall.

8. A fluidic flowmeter comprising:
   a. a fluid amplifier having an interaction chamber,
   b. fluid accelerating means receiving at least a portion of fluid the flow rate of which is to be measured and forming a fluid jet directed into the chamber,
   c. receiver means disposed on opposite sides of the jet for receiving differentially variable portions of the jet fluid,
   d. conduit means forming control ports for laterally deflecting the jet with respect to the receiver means,
   e. said amplifier being constructed and arranged to have a proportional input-output characteristic,
   f. feedback conduit means interconnecting the receiver means and the control ports of the amplifier,
   g. means for maintaining a constant phase lag in the feedback means of said fluid amplifier including means to vary the input and output resistance of the amplifier in response to the jet velocity whereby the amplifier oscillates at a frequency which varies in accordance with the flow rate of the fluid passing through the fluid accelerating means,
   h. and flow rate indicating means including means for sensing the jet oscillation frequency.

9. The flowmeter of claim 8 wherein the phase shift of the feedback network comprising the receiver means, the feedback conduit means and the control ports remains essentially constant by positioning the control ports with respect to the jet so that the fluid resistance of the network varies proportionally with the jet velocity.

* * * * *